(12) United States Patent
Kirk et al.

(10) Patent No.: US 10,642,833 B2
(45) Date of Patent: May 5, 2020

(54) ACCELERATING DATABASE QUERIES USING COMPOSITE UNION ENUMERATION

(71) Applicant: Sybase, Inc., Dublin, CA (US)

(72) Inventors: Steven Kirk, Chelmsford, MA (US); Roland McKenney, Burlington, MA (US); David Walrath, Stow, MA (US)

(73) Assignee: Sybase, Inc., Dublin, CA (US)

( * ) Notice: Subject to any disclaimer, the term of this patent is extended or adjusted under 35 U.S.C. 154(b) by 346 days.

(21) Appl. No.: 14/823,961

(22) Filed: Aug. 11, 2015

(65) Prior Publication Data

US 2017/0046388 A1    Feb. 16, 2017

(51) Int. Cl.
*G06F 16/00* (2019.01)
*G06F 16/2453* (2019.01)
*G06F 16/901* (2019.01)

(52) U.S. Cl.
CPC .... *G06F 16/24544* (2019.01); *G06F 16/9017* (2019.01)

(58) Field of Classification Search
CPC .................. G06F 17/30023; G06F 16/9017
See application file for complete search history.

(56) References Cited

U.S. PATENT DOCUMENTS

| | | |
|---|---|---|
| 5,548,770 A | 8/1996 | Bridges |
| 5,742,806 A | 4/1998 | Reiner et al. |
| 5,761,564 A | 6/1998 | Piccinino, Jr. |
| 5,838,965 A | 11/1998 | Kavanagh et al. |
| 6,377,943 B1 | 4/2002 | Jakobsson |
| 6,460,043 B1 | 10/2002 | Tabbara et al. |
| 6,694,322 B2 | 2/2004 | Warren et al. |
| 6,785,673 B1 | 8/2004 | Fernandez et al. |
| 6,823,329 B2 | 11/2004 | Kirk et al. |
| 6,862,602 B2 | 3/2005 | Guha |
| 6,910,044 B2 | 6/2005 | Weinberg et al. |
| 7,171,352 B2 | 1/2007 | Chang et al. |
| 7,440,957 B1 | 10/2008 | Kotidis et al. |
| 7,516,121 B2 | 4/2009 | Liu et al. |
| 7,672,925 B2 | 3/2010 | Kirk et al. |
| 8,321,429 B2 | 11/2012 | Kirk et al. |
| 2002/0093522 A1 | 7/2002 | Koskas |
| 2002/0095421 A1 | 7/2002 | Koskas |
| 2003/0187858 A1 | 10/2003 | Kirk et al. |
| 2003/0225779 A1 | 12/2003 | Matsuda |
| 2004/0054683 A1 | 3/2004 | Nishizawa et al. |
| 2005/0149472 A1 | 7/2005 | Schreier |

(Continued)

*Primary Examiner* — Ajith Jacob
(74) *Attorney, Agent, or Firm* — Mintz Levin Cohn Ferris Glovsky and Popeo, P.C.

(57) ABSTRACT

A method may include accepting a database query including an operator requesting two or more incoming tuple streams be combined into a result tuple stream. At least one data value in the incoming tuple streams may be represented by an enumeration value. The method may include generating a query execution plan for the database query. The query execution plan may include encoding the enumeration value and a corresponding source identifier into a composite union enumeration. The source identifier may identify which of the two or more tuple streams corresponds to the enumeration value. The method may further include executing the database query according to the query execution plan to obtain the data value and providing the data value in response to the database query.

20 Claims, 5 Drawing Sheets

(56) References Cited

U.S. PATENT DOCUMENTS

| | | |
|---|---|---|
| 2005/0203876 A1 | 9/2005 | Cragun et al. |
| 2006/0235818 A1 | 10/2006 | Muras |
| 2007/0203709 A1 | 8/2007 | Yasutaka |
| 2008/0027892 A1 | 1/2008 | Carnahan et al. |
| 2008/0114793 A1 | 5/2008 | Grosset et al. |
| 2008/0162414 A1 | 7/2008 | Kirk et al. |
| 2008/0222136 A1* | 9/2008 | Yates ................ G06F 17/30321 |
| 2012/0030220 A1* | 2/2012 | Edwards ........... G06F 17/30474 |
| | | 707/754 |

* cited by examiner

```
┌─────────────────────────────────────────────┐
│ Accept database query including operator    │
│ requesting two or more incoming tuple       │
│ streams be combined into result tuple       │
│ stream, wherein at least one data value in  │← 410
│ incoming tuple streams is represented by    │
│ enumeration value                           │
└─────────────────────────────────────────────┘
                    │
                    ▼
┌─────────────────────────────────────────────┐
│ Generate query execution plan.              │← 420
└─────────────────────────────────────────────┘
                    │
                    ▼
┌─────────────────────────────────────────────┐
│ Query execution plan includes encoding      │
│ enumeration value and corresponding source  │
│ identifier into composite union             │
│ enumeration, wherein source identifier      │← 430
│ identifies which of two or more tuple       │
│ streams corresponds to enumeration value    │
└─────────────────────────────────────────────┘
                    │
                    ▼
┌─────────────────────────────────────────────┐
│ Query execution plan further includes       │
│ decoding composite union enumeration to     │← 440
│ corresponding enumeration value and the     │
│ source identifier                           │
└─────────────────────────────────────────────┘
                    │
                    ▼
┌─────────────────────────────────────────────┐
│ Query execution plan further includes       │
│ selecting look-up table to map enumeration  │← 450
│ value into data value, wherein selecting is │
│ based on source identifier                  │
└─────────────────────────────────────────────┘
                    │
                    ▼
┌─────────────────────────────────────────────┐
│ Execute database query according to query   │
│ execution plan to obtain data value, and    │← 460
│ providing data value in response to         │
│ database query                              │
└─────────────────────────────────────────────┘
```

FIG. 4

ACCELERATING DATABASE QUERIES USING COMPOSITE UNION ENUMERATION

FIELD

The subject matter described herein relates to accessing databases using statements containing the SQL language UNION ALL operator, or some semantically equivalent operator in a non-SQL database.

BACKGROUND

Databases are used throughout business, science, and engineering. Databases are used extensively in business enterprise resource planning ("ERP") systems, solutions, programs, and other software to assist businesses in performing various tasks. To access data stored in databases, queries are performed. The day-to-day operations of a business may include a multitude of tasks utilizing database queries such as purchasing, sales, payroll, accounting, timekeeping, benefits administration, security, maintenance, and various other tasks that businesses need to perform. Some of the databases may include trillions of records or more. Moreover, the databases may contain different sets of data stored as separate tables within the database. Some applications may require combining multiple disjoint sets of data into a single set for subsequent processing. The capability to combine a collection of disjoint sets in a cost efficient, storage efficient, and administrative efficient manner is important to reducing both economic and computational costs of many database applications.

SUMMARY

In one aspect, a database query is accepted that includes an operator requesting two or more incoming tuple streams be combined into a result tuple stream. At least one data value in the incoming tuple streams may be represented by an enumeration value. A query execution plan may be generated for the database query. In some example embodiments, the query execution plan may include encoding the enumeration value and a corresponding source identifier into a composite union enumeration. In some example embodiments, the source identifier identifies which of the two or more tuple streams corresponds to the enumeration value. The composite union enumeration may be decoded to the corresponding enumeration value and the source identifier. A look-up table may be selected to map the enumeration value into the data value, wherein the selecting is based on the source identifier. The database query may be executed according to the query execution plan to obtain the data value. The data value in response to the database query.

In some variations, one or more of the features disclosed herein including the following features can optionally be included in any feasible combination. The operator may include the SQL language UNION ALL operator. The source identifier may be encoded as an integer representing the source identifier. The composite union enumeration may include a pair of values, wherein one member of the pair is the enumeration value and the other member of the pair is an encoding of the source identifier. In some example embodiments, a plurality of composite union enumerations may minimize a storage required to store the composite union enumerations, and/or each composite union enumeration may include a pair of integer values. The composite union enumeration may include a single integer value, wherein the single integer value lies in one of a plurality of ranges. The plurality of ranges may include a quantity of ranges equal to a quantity of the source identifiers. The one of the plurality of ranges may encode the source identifier, and/or a distance from the start of the one of the plurality of ranges to the single integer value may encode the enumeration value. A decision to create the query execution plan may be made based on an estimate of costs and benefits. The at least one data value in the incoming tuple streams represented by the enumeration value may include one or more of: a column represented using an enumerated storage, a secondary enumeration over a column represented using an enumerated storage, a value expression encoded using a temporary enumeration, and a composite union enumeration from a lower level UNION ALL operator.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter disclosed herein provides numerous benefits. The composite union enumeration disclosed herein achieves reductions in database storage requirements, and costs associated with database storage and management. In particular, where multiple tuple sets are combined to produce a composite tuple set, and where for some member of the incoming tuple sets each incoming value is either a column that was stored using enumerated storage, or a value set that could be inexpensively turned into a temporary enumeration, then the instant subject matter reduces the storage needed and speeds access to the resulting composite tuple set, and thereby improves the performance of queries using such operations. Some aspects of temporary enumeration are described in U.S. Pat. No. 7,672,925, which is hereby incorporated by reference in its entirety.

DETAILED DESCRIPTION

In some example embodiments, some applications may require combining multiple disjoint sets of data into a single set for subsequent processing. The disjoint sets may be data that resides within different tables, for example, from a CATALOG_SALES table and a RETAIL_STORE_SALES table. Those disjoint data sets may also be from different databases, or be from a more complex set of preceding query operations. The SQL language UNION operator enables two or more such disjoint data sets (often referred to as virtual tables) to be combined, where each member of each disjoint data set is a tuple containing an ordered list of values. The resulting combined data set then proceeds on to any subsequent query operations requested by a user. In the SQL language, there are two variants of the UNION operator. The UNION ALL variant unconditionally combines the incoming disjoint tuple sets into a single result tuple set (also referred to as the result virtual table). Because the combining is unconditional, the result tuple set may therefore contain two or more tuples with the same sets of values (i.e. duplicate tuples). The UNION or UNION DISTINCT variant combines the incoming disjoint tuple sets into a single tuple set, but then eliminates all the duplicate tuples, regardless of whether the duplicates came from within one of the UNION incoming tuple sets, from across the different incoming tuple sets, or both. The capability to combine a collection of disjoint tuple sets in a cost efficient, storage efficient, and administrative efficient manner is important to reducing both economic and computational costs of many database applications.

To improve the performance of database queries in the real world, one approach is to consider what operations within the queries are the most expensive in terms of the time and resources consumed. An example of an expensive operation includes the creation and management of temporary data structures such as sorts and hash tables. The computational and storage costs may be influenced by at least three factors: (1) how many tuples (or records) are being stored; (2) how expensive is it to compare tuples; and (3) the size of each tuple being stored. Factor (1) may be controlled at least in part by the nature of the query and may also be controlled by the query plan selected by an optimizer. Some example embodiments are directed to reducing the costs associated with factor (3).

Some example embodiments of the subject matter disclosed herein simultaneously improve query performance and reduce the tuple storage requirements. For example, query times may be reduced and/or tuple storage requirements may be reduced when a query contains a UNION ALL operator to combine sets of tuples from two or more query blocks into a single tuple stream. For illustration, Table A shows an example of Structured Query Language (SQL) code that may illustrate a reduced query time and/or a reduced tuple storage requirement.

TABLE A

SELECT R.A, SUM(T.Y)
FROM ( SELECT T1.X, T1.Y FROM T1
UNION ALL
SELECT T2.X, T2.Y FROM T2
UNION ALL
SELECT T3.Y, T3.Y FROM T3

TABLE A-continued

) AS T(X, Y)
RIGHT OUTER JOIN R
ON R.X = T.X
GROUP BY R.A
ORDER BY R.A

Figure 1:
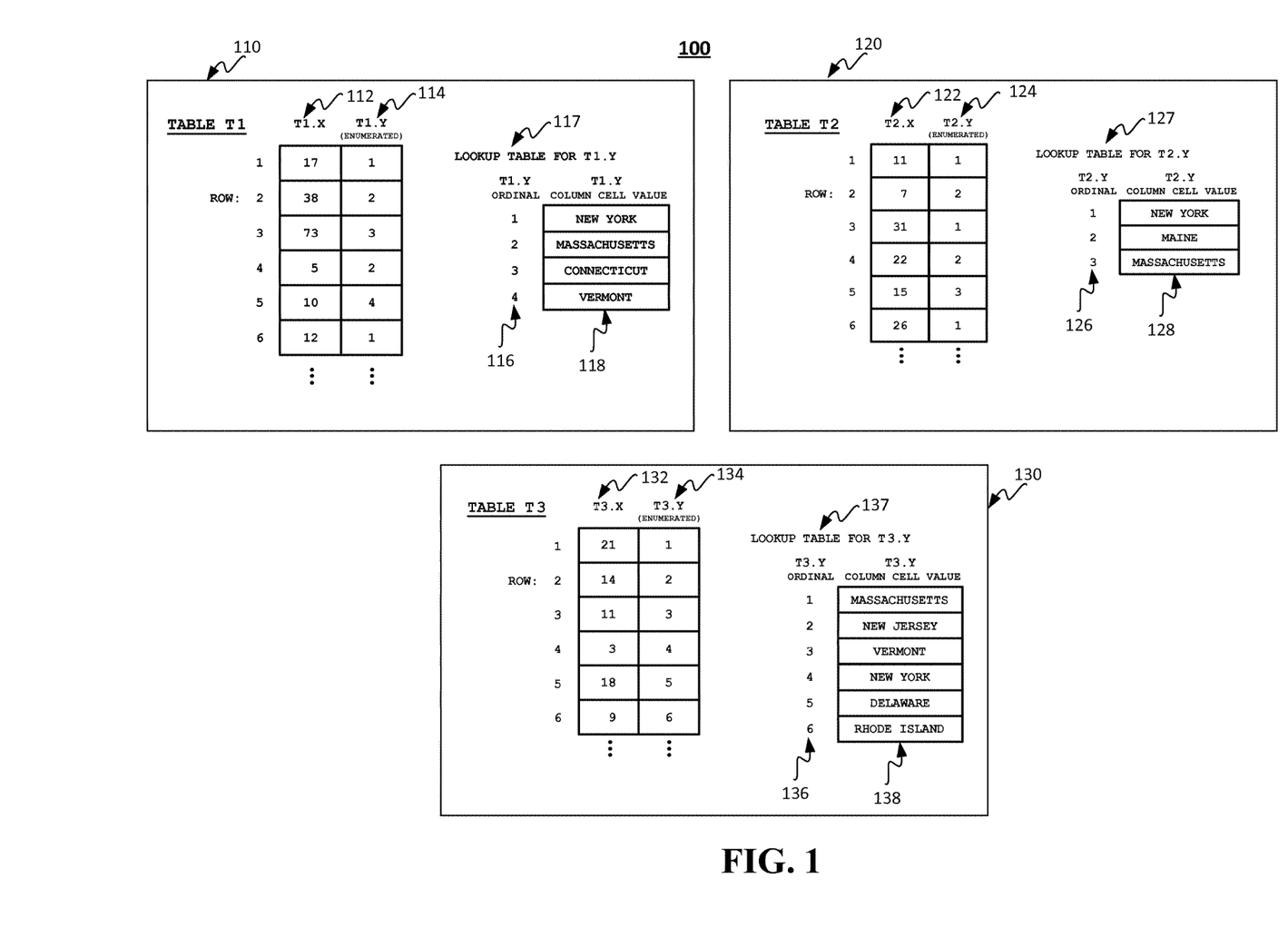
FIG. 1 depicts an example of input tables to illustrate composite union enumeration, in accordance with some example embodiments.

In the example SQL query shown in Table A, the UNION ALL operators may combine the tuple streams coming from various sources of data such as tables T1, T2, and T3 in FIG. 1 into a single unified result tuple stream, labeled as T in Table A, wherein each tuple in the stream contains the pair of values {T.X, T.Y}. That result tuple stream is then passed upstream from the UNION ALL to the JOIN operator joining that unified tuple stream to a table R. In some example embodiments, instead of the actual values for column Y from the source tables T1, T2, and T3, virtual column T.Y may include enumerated representations of the actual values. Since the JOIN operator does not need the actual values for T.Y, by enumerating the virtual column T.Y, the storage requirements for that JOIN operator may be reduced. In the foregoing example there is one result tuple element, T.Y, and each of the input tuple elements are enumerations. In some example embodiments, queries may contain multiple union result tuple elements that satisfy this criteria, and a composite enumeration can be created for each such result tuple element.

In some example embodiments, a query containing two UNION ALLs, such as shown in Table A, may include three columns T1.Y, T2.Y, and T3.Y that are each stored as enumerated columns. For example, FIG. 1 shows tables T1, T2, and T3. In the example of FIG. 1, T1 at 110 may include column T1.X with values from row 1 to 6 including 17, 38, 73, 5, 10, and 12. Table T1 may include column T1.Y with values from row 1 to 6 including 1, 2, 3, 2, 4, and 1. The values of column T1.Y may be enumerated values where the actual value corresponding to the enumerated value of 1 is "New York," the actual value corresponding to the enumerated value of 2 is "Massachusetts," the actual value corresponding to the enumerated value of 3 is "Connecticut," and the actual value corresponding to the enumerated value of 4 is "Vermont." For example, look-up table 117 depicts the mapping from the enumerated values 1-4 in T1.Y at 116 to actual values at 118. A table, such as Table T1, may include other values, and/or other numbers of columns and/or rows.

In the example of FIG. 1, Table T2 may include column T2.X with values from row 1 to 6 including 11, 7, 31, 22, 15, and 26. Table T2 may include column T2.Y with values from row 1 to 6 including 1, 2, 1, 2, 3, and 1. The values of column T2.Y may be enumerated values where the actual value corresponding to the enumerated value of 1 is "New York," the actual value corresponding to the enumerated value of 2 is "Maine," and the actual value corresponding to the enumerated value of 3 is "Massachusetts." For example, look-up table 127 depicts the mapping from the enumerated values 1-3 in T2.Y at 126 to actual values at 128. A table, such as Table T2, may include other values, and/or other numbers of columns and/or rows.

In the example of FIG. 1, Table T3 may include column T3.X with values from row 1 to 6 including 21, 14, 11, 3, 18, and 9. Table T3 may include column T3.Y with values from row 1 to 6 including 1, 2, 3, 4, 5, and 6. The values of column T3.Y may be enumerated values where the actual value corresponding to the enumerated value of 1 is "Massachusetts," the actual value corresponding to the enumerated value of 2 is "New Jersey," the actual value corresponding to the enumerated value of 3 is "Vermont," the actual value corresponding to the enumerated value of 4 is "New York," the actual value corresponding to the enumerated value of 5 is "Delaware," the actual value corresponding to the enumerated value of 6 is "Rhode Island." For example, look-up table 137 depicts the mapping from the enumerated values 1-6 in T3.Y at 136 to actual values at 138. A table, such as Table T3, may include other values, and/or other numbers of columns and/or rows.

In some example embodiments consistent with the instant subject matter, a composite enumeration is disclosed which combines a set of input enumeration values flowing into the UNION ALL and produces a single set of composite enumeration values flowing out of the UNION ALL. In some example embodiments, the foregoing composite enumeration may be referred to as composite union enumeration. Composite union enumeration may be simple and/or inexpensive to set up, and may be inexpensive to apply during execution. As used herein, inexpensive may refer to a reduced or low computational and/or storage cost, as well as referring to a reduced and/or reduced monetary cost to implement and administer, particularly when the number of tuples may be in the millions or more.

In some example embodiments, composite union enumeration for T.Y may combine the incoming enumerated values, such as columns T1.Y, T2.Y, and/or T3.Y in FIG. 1, along with a reference to the originating table (e.g. T1, T2, etc.), into a composite union enumeration based on the enumeration values in those columns without requiring the actual values. For example, a composite union enumeration may use the enumeration values in T1.Y of 1, 2, 3, and 4, without requiring the corresponding actual values of "New York" represented by 1, "Massachusetts" represented by 2, "Connecticut" represented by 3, or "Vermont" represented by 4. The actual values (e.g. "New York," "Massachusetts," etc) may not be needed until the projection of the actual cell values, which may occur immediately prior to an operator needing the actual cell values. The actual values may be referenced through the composite enumeration values, to the enumeration values in the input tables, to the actual values. The composite union enumeration may also include an enumeration value representative of the originating table. For example, an enumeration value may be representative of which table, T1, T2, or T3, an input enumeration value corresponds.

For example, a composite union enumeration may be represented by a pair of values, for example (<n>, <m>). The values (<n>, <m>) may represent a composite union enumeration from the <n>th input tuple stream and the <m>th enumeration value from the <n>th input tuple stream. Continuing the example of FIG. 1, the maximum incoming enumeration value from the T3 input tuple stream is 6, from the T2 input tuple stream is 3, and from the T1 input tuple stream is 4. Because the maximum enumeration value in T1, T2, and T3 is 6, the maximum <m> value may be 6. Input tuple identifier number (or table identifiers) may be assigned to the three input tuple streams in the example of FIG. 1. For example, input identifier numbers may be assigned as 0 for T1, 1 for T2, and/or 2 for T3. Any other numbering or identifiers may be used instead or in addition the foregoing identifiers.

Figure 2:
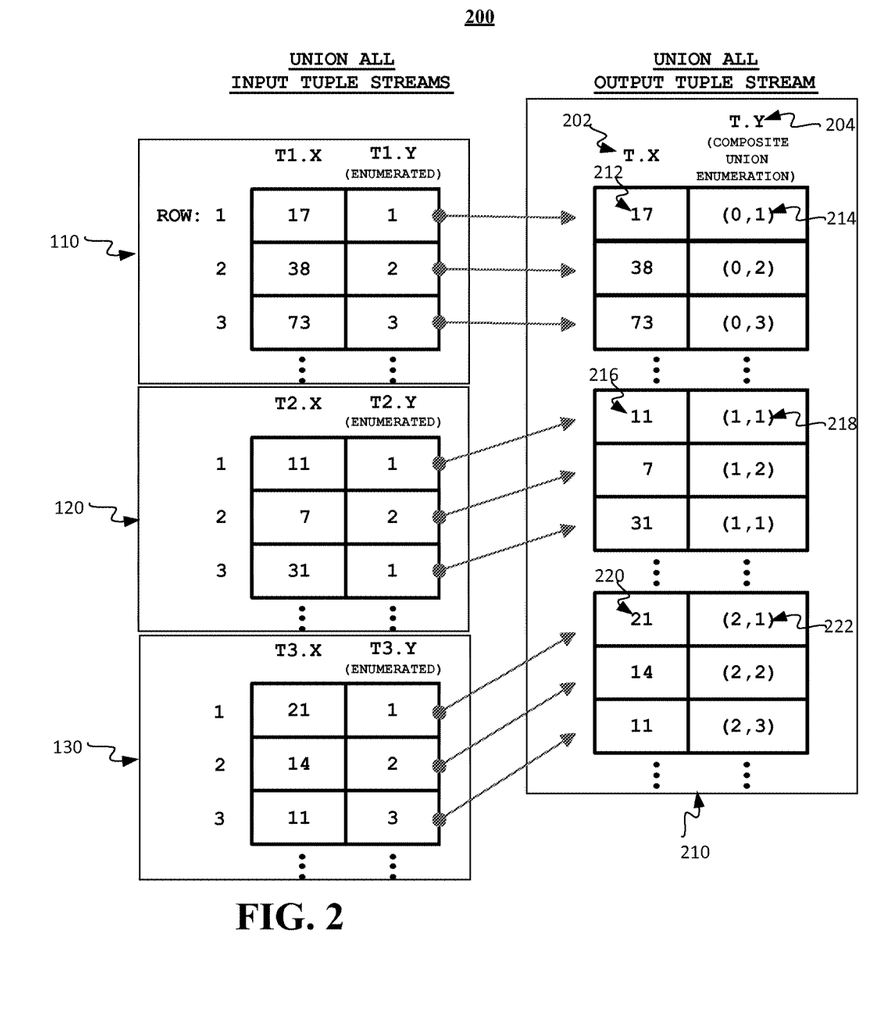
FIG. 2 depicts examples of input tuple streams and an output tuple stream created using composite union enumeration, in accordance with some example embodiments.

FIG. 2 depicts example input tuple streams and an example of an output tuple stream illustrating composite union enumeration. FIG. 2 also refers to FIG. 1. In the example of FIG. 2, input tuple streams 110, 120, and 130 are combined to produce output tuple stream 210. A tuple stream may also be referred to as a virtual table. Input tuple stream {T3.X, T3.Y} is appended to input tuple stream {T2.X, T2.Y} which is appended to input tuple stream {T1.X, T1.Y} to produce a composite T.X tuple stream 202. For example, for the result tuple element T.X 202, the value 17 from T1.X at row 1 may be imported into row 1 of T.X at 212 in 210. The value 38 from T1.X at row 2 may be imported into row 2 of T.X at in 210. Additional values from T1.X may also be appended to T.X. In the example of FIG. 2, appended after the last value of T1.X may be the value 11 from row 1 of T2.X at 216 in 210. Subsequent rows in T2.X may be appended after row 1. After the last row of T2.X, the value 21 from row 1 of T3.X may be appended at 220 in 210. Tuple streams T1.X, T2.X, and T3.X may be combined in any other order as well.

For the result tuple element T.Y 204, the input tuple stream element values may come from T3.Y, T2.Y, and T1.Y to produce one component of a composite union enumeration tuple stream. For example, composite enumeration tuple stream 204 may include pairs of values such as pairs 214, 218, and 222. In some example embodiments, the first value in the pair corresponds to an enumeration value identifying the input tuple source. In the example of FIG. 2, input tuple T1 at 110 may have an identifier value of 0. Accordingly, the first value in pair T.Y at 214 may have the identifier value 0. The second number in the pair at 214 may be the enumerated value 1 from the first row of T1.Y in T1 at 110. Accordingly, in the example of FIG. 2, the composite enumeration pair 214 has values (0,1). Table T2 at 120 may have an identifier value of 1. Accordingly, the first value in pair T.Y 218 may have the identifier value 1. The second number in the pair 218 may be the enumerated value 1 from the first row of T2.Y in Table T2 120. Accordingly, in the example of FIG. 2, the composite enumeration pair 218 has values (1,1). Table T3 at 130 may have an identifier value of 2. Accordingly, the first value in pair T.Y at 222 may have the identifier value 2. The second number in the pair 222 may be the enumerated value 1 from the first row of T3.Y in T3 at 130. Accordingly, in the example of FIG. 2, the composite enumeration pair 222 has values (2,1).

In some example embodiments, the storage resources needed to store the output tuple stream 210 may be affected by how the input tuple enumerated values (e.g. T1.Y, T2.Y, and T3.Y in FIG. 1) in the composite union enumeration pairs in T.Y 204 (e.g. T.Y enumerated values 0, 1, 2, 3, 4, 5, and 6 in FIG. 2) are represented. For example, the input tuple enumeration may be represented by a value stored in an 8-bit byte, or the input enumeration value may be represented by fewer bits. For example, an 8-bit representation of the input enumeration value may require more storage resources than a 2-bit representation. The storage resources needed to store the output tuple stream 210 may be affected by how the enumerated identifiers identifying the input table (e.g. 0, 1, and 2 in FIG. 2) are represented. For example, an 8-bit representation of the enumerated identifiers may require more storage resources than a 2-bit representation.

There are five preferred ways that the composite union enumeration may be represented. Selection of the optimal choice from among these five ways could be done specifically for a particular virtual column in a specific query where the relevant costs and benefits may depend on (a) the number of distinct values in each incoming enumeration, (b) the number of incoming tuple streams (i.e. the number of SELECT blocks being combined by UNION ALL operators), (c) the total number of tuples flowing, and/or (d) the relative computing costs for arithmetic, byte access, and bit-masking operations. That analysis of the estimated costs and benefits may also result in a decision to not create a composite union enumeration for some columns in some queries. Furthermore, that cost benefit analysis should be done independently for each value within the unified tuple set based on the characteristics of the data sets being unified into a virtual column, and the uses being made of that virtual column in subsequent query operators for the query. For our example query, the analysis of whether the virtual column T.Y should be represented using a composite union enumeration, and if so which form, should be done independently of the analogous analysis for virtual column T.X.

A first way to add information representing a composite union enumeration may include prepending (or appending) the input enumeration value at a byte granularity to another byte containing an integer value representing from which input stream the incoming enumeration originated. A first byte may contain a value representing to which input stream the second byte is related. In the example of FIGS. 1 and 2, an enumeration value between 0 and 2 may represent that the second byte is related table T1, T2, or T3. The incoming enumeration value may be represented by a second value within another byte. In the example of FIGS. 1 and 2, the input enumeration values between 1 and 6 (representing which state: Massachusetts, New Jersey, Vermount, New York, Delaware, or Rhode Island) may be represented by a second byte. Thus, for the T.Y virtual column, the composite union enumeration may be represented by the two bytes, one for the input stream identifier (first byte), and one for the input enumeration value (second byte). In some example embodiments, the first byte may replace the second byte and the second byte may be replaced with the first byte. In some example embodiments, a byte may comprise 8 bits.

A second way to add information representing a composite union enumeration may include combining the input enumeration value and the input stream identifier at a bit granularity (instead of byte granularity) by using only the necessary number of bits. In the example of FIGS. 1 and 2, where the maximum enumeration value is 6, 3 bits are sufficient to enumerate the 6 states (3 bits may represent up to 8 values). Two bits are sufficient to represent the related input stream (or table) since the input stream number maximum value is 2 (2 bits may represent up to 4 values). Thus, in the example of FIGS. 1 and 2, 5 bits may represent each of the composite union enumeration values where the composite union enumeration using 3 bits for the input enumeration value and 2 bits for the input stream identifier. In the foregoing example, where the total number of bits is 5, one 8-bit byte per tuple is sufficient to hold the 5-bit value. An 8-bit byte may be used where only 5 bits are needed for ease of implementation. In some example embodiments, the second way requires ½ the storage space per value (one byte instead of two) compared to the first way. The second way may use additional bit-shifting and bit-masking that the first way may not.

In the forgoing byte-wise and bit-wise granularities for composite union enumeration values representing both the incoming enumeration value and from which input stream the incoming enumeration originated, the incoming enumeration and stream identifier values may be stored together. The foregoing example included the input stream enumeration value occupying the second byte (byte-wise granularity) or the second part of the byte (bit-wise granularity), and the stream identifier occupying the first byte or portion of the byte. In some example embodiments, the order may be reversed wherein the stream identifier may be first and the input enumeration value may be second.

Figure 3:
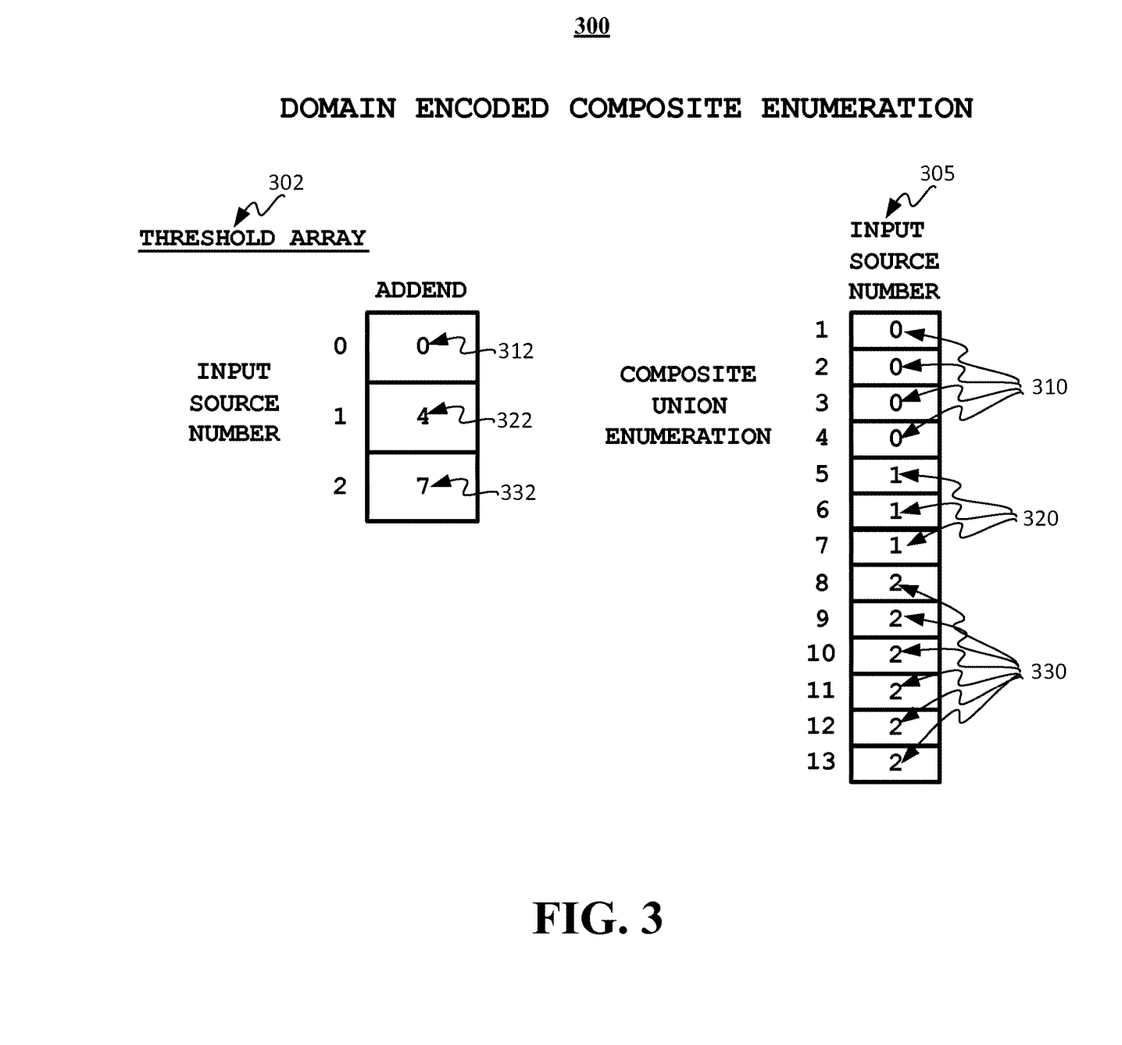
FIG. 3 depicts an example of domain encoded composite enumeration, in accordance with some example embodiments.

FIG. 3 depicts a third way to add information representing a composite union enumeration. In some example embodi-
ments, one enumeration value may represent both a stream identifier and the input enumeration value. For example, a single integer domain whose size is the sum of the domain sizes of the input streams may represent the composite enumeration. In the example of FIGS. 1 and 2, T1.Y has 4 possible values (New York, Massachusetts, Connecticut, Vermont), T2.Y has 3 possible values (New York, Maine, Massachusetts), and T3.Y has 6 possible values (Massachusetts, New Jersey, Vermont, New York, Delaware, Rhode Island). In some example embodiments, a single domain spanning all of the possible values for each input stream has a total of 13 possible values. The 13 values may be represented by a 4-bits per composite enumeration value rather than the 5 bits used by foregoing second way or the 16 bits used by the foregoing first way.

In some example embodiments, one enumeration value may represent both a input stream identifier and the input enumeration value by: (a) mapping the four T1.Y enumeration values to the same value in the composite domain (e.g. enumeration values 1, 2, 3, 4 in 305) corresponding to T1, mapping the three T2.Y enumerations to the composite domain by adding the value of 4 to the T2 enumerations of 1, 2, and 3 (e.g. producing enumeration values 5, 6, 7 in 305), and mapping the six T3 enumerations to the composite domain by adding the value 7 to the T2 enumerations 1, 2, 3, 4, 5, 6 (e.g. producing enumeration values 8, 9, 10, 11, 12, 13 in 305).

In the foregoing example, actual values may be duplicated for the different input streams. For example, Massachusetts is included in each input stream and accounts for 3 of the 13 possible actual values. For example, Massachusetts in T1.Y may be represented by a composite enumeration value of 3, Massachusetts in T2.Y may be represented by a composite enumeration value of 7, and Massachusetts in T3.Y be represented by a composite enumeration value of 8. Thus, both the input stream (T1, T2, or T3) and the value (Massachusetts, New York, etc.) may be determined from the composite enumeration value. In this way, the different subsets of the domain identify the input source. The composite union enumeration thus encodes the input source number based on which sub-domain of the composite domain the composite enumeration value is in, and then the input enumeration value can be computed as the distance from the end of the preceding sub-domain. For example, threshold values may be used as addends indexed by the input source identifier. In the example of FIGS. 1 and 2, the T1.Y has 4 values that may be indexed to source identifier 0 (T1.Y/T1.X) with addend 0 at 312. The actual values of T1.Y (1. New York, 2. Massachusetts, 3. Connecticut, 4. Vermont) may be determined by subtracting the addend (0 in this case) from the composite enumeration and selecting the remaining actual value corresponding to the remaining enumeration value. For example composite enumeration value of 4 corresponds to T1.Y at enumeration value 4 or Vermont. Continuing the example, T2.Y has 3 values that may be indexed to source identifier 1 (T2.Y/T2.X) with addend 4 at 322. The actual values of T2.Y (1. New York, 2. Maine, 3. Massachusetts) may be determined by subtracting the addend (4 in this case) from the composite enumeration and selecting the remaining actual value corresponding to the remaining enumeration value. For example, composite enumeration value of 6 corresponds to T2.Y at enumeration value 2 or Maine. Continuing the example, T3.Y has 6 values that may be indexed to source identifier 2 (T3.Y/T3.X) with addend 7 at 332. The actual values of T3.Y (1. Massachusetts, 2. New Jersey, 3. Vermont, 4. New York, 5. Delaware, and 6 Rhode Island) may be determined by subtracting the addend (7 in this case) from the composite enumeration and selecting the remaining actual value corresponding to the remaining enumeration value. For example composite enumeration value of 12 corresponds to T3.Y at enumeration value 5 or Delaware. In this way, an addend may index values from the input sources at 310, 320, and 330.

Determining the actual values from the composite enumeration may use the sub-domain thresholds (addends) in a linear or binary search through the threshold array 302, or an array indexed by the composite union enumeration value and containing the input source number 305. Once the input source number 305 has been determined, the input enumeration value can be determined by subtracting the addend found within the threshold array 302.

In some example embodiments, the input enumeration values may be used as the identifier for the domain sub-range and the input source number may be used as the offset within each sub-range. For example, when there are more input sources than there are values within any of the input enumerations, the input enumeration values may be used as the identifier.

In some example embodiments, composite enumeration values may be adjusted when incoming enumerations are zero-based or one-based, input source numbers are zero-based or one-based, and output composite union enumerations are zero-based or one-based. In the example of FIGS. 1-3, the input and output enumerations were one-based and the input source numbers were zero-based. These choices were based on a particular implementation. Other implementations may result in different choices. The choice of basis of the enumeration values may be influenced by, among other factors, the preferred implementation language, the reservation of the value 0 as a "null" or "not specified" value in the representation domain, the relative cost of processor time versus storage and transmission costs, and the implementation choices of external components.

In some example embodiments, source enumerations may be columns that are stored as enumerated storage. In some example embodiments, the foregoing handling of UNION ALL enumerations may be used when the input value expressions are either: (a) stored using enumerated storage, or (b) already stored as another form of enumeration. For example, a secondary enumeration or an enumeration from a lower level UNION ALL, or a temporary enumeration.

In some example embodiments, the input value expressions have the same data types. In some example embodiments, the input value expressions may include mismatched data types. For example, for a input source requiring a CAST, a cell value retrieval function may be replaced with a retrieval function that returns the result of a CAST over the original cell value by computing that CAST at most once per entry in the lookup table.

In some example embodiments, a query containing a UNION ALL operator may include one or more sets of value expressions that are unified into a single value expression (e.g. the example above where the set of {T1.Y, T2.Y, T3.Y} is unified into the virtual column (T.Y)).

In some example embodiments, each member of a unified set of value expressions may be an enumeration, or may be turned into an enumeration. For example each member may be a column with enumerated storage, a secondary enumeration over a column with enumerated storage, an expression that can be converted into a temporary enumeration (e.g. a constant, a value expression for a small number of tuples, or a value expression with a known small number of distinct values), and/or a composite enumeration from a lower level UNION ALL expression.

In some example embodiments, a query operator above the UNION ALL (or executed before the UNION ALL) may benefit from the reduction in tuple storage space by using an enumeration instead of an actual cell value. For example, the join with table R above the UNION ALL in the example above in Table A.

In some example embodiments, a composite union enumeration representation may include mapping an enumeration value from any specified input source into a composite union enumeration value. The creation of a composite union inverse function may convert a composite union enumeration value into a cell value (or actual value). The conversion may include mapping a composite union enumeration value into an input enumeration value, and identifying which of the set of input enumerations the value came from (e.g. T1, T2, or T3 in FIG. 1), and thus which table or other tuple source to use to retrieve the actual cell value. In some example embodiments, a composite union enumeration created for a UNION ALL value expression replaces the value expression within the query operator tree, above the UNION ALL operator but below where that value expression's cell value is required, with the composite union enumeration. In some example embodiments, wherever that cell value is required, the original value expression may be replaced with the composite union inverse of the composite union enumeration representation.

In some example embodiments, the composite union enumeration may be represented as pair of explicit integer values stored together. In some example embodiments, a single integer value domain may be used, within which the which subset of the domain encodes the table or stream identifier, and the distance from the start of that domain encodes the value within the identified stream. In some example embodiments, the specific encoding for the composite union enumeration may be selected at query optimization time based on estimated run-time costs.

Figure 4:
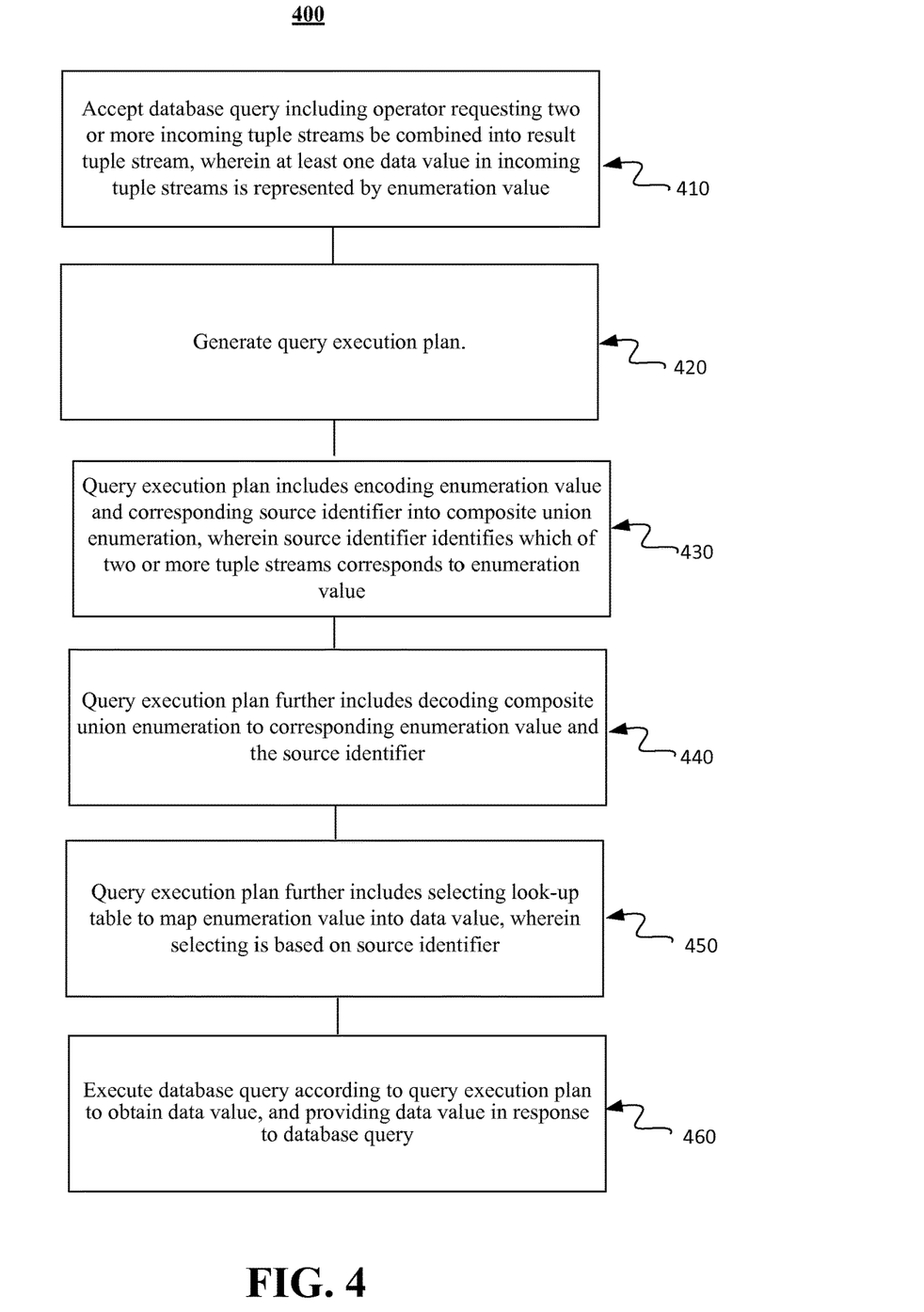
FIG. 4 depicts a process, in accordance with some example embodiments.

FIG. 4 depicts a process, in accordance with some example embodiments. At 410, a database query may be accepted that includes an operator requesting two or more incoming tuple streams be combined into a result tuple stream. A data value in the incoming tuple streams may be represented by an enumeration value. At 420, a query execution plan may be generated. At 430, the query execution plan may include encoding the enumeration value and a corresponding source identifier into a composite union enumeration. The source identifier may identify which of the two or more tuple streams corresponds to the enumeration value. At 440, the query plan may include decoding the composite union enumeration to the corresponding enumeration value and the source identifier. At 450, the query plan may include selecting a look-up table to map the enumeration value into the data value, wherein the selecting is based on the source identifier. At 460, the database query may be executed according to the query execution plan to obtain the data value, and the data value may be provided in response to the database query. The description of FIG. 4 also refers to FIGS. 1-3.

At 410, a database query may be received from a requestor. The requestor may be a person submitting a query, or an automated computing system. For example, a computing apparatus such as FIG. 5 at 500 detailed below may receive a query for a data value. The database query may be accepted and may include an operator requesting two or more incoming tuple streams be combined into a result tuple stream. In some example embodiments, the result tuple stream may include values of a composite tuple set. A data value in the incoming tuple streams may be represented by an enumeration value.

At 420, a query execution plan may be generated. The query execution plan may include: encoding on or more enumeration values and corresponding source identifiers into a composite enumeration at 430; decoding the composite enumeration to the corresponding enumeration value and the source identifier at 440; and/or selecting a look-up table to map the enumeration value into a data value at 450.

At 430, the encoding may combine the two incoming tuple streams into the result tuple stream (or composite tuple set). For example, the incoming tuple streams may include a first tuple stream that may include first enumeration values and a second tuple stream that may include second enumeration values. The encoding may produce a result tuple stream that encodes enumeration values form the incoming tuple streams and the source identifiers indicating which tuple stream each enumeration value is associated with. In some example embodiments, the result tuple stream may be a composite union enumeration.

To illustrate features consistent with some example embodiments, two incoming tuple streams may be combined into a result tuple stream. In this example, the first tuple stream or first table may include first enumeration values. For example, a first table such as T1 110 in FIG. 1 may include enumeration values such as enumeration values 114 representing actual values T1.Y at 118. In the example of FIG. 1, table T1 has two columns and more than 6 rows. In the example of FIG. 1, row 5 of T1 has T1.X value of 10, where T1.X refers to the first column of T1. Row 5 of T1 has T1.Y value of 4, where T1.Y refers to the second column of T1. The T1.Y value may be an enumeration value representing an actual value of "Vermont." Lookup table 117 may include one column representing enumeration values and a second column for the actual values. The actual value such as "Vermont" may be found by selecting the row with the first column value corresponding to the enumeration value. The actual value may be determined as the second column value in the same row as enumeration value. In the foregoing examples, table T1 and look-up table 117 may organize data in columns, but the data may be organized in rows as well.

The result tuple stream or composite tuple set may further include a second table. The second table may include second enumeration values. For example, a second table such as T2 120 in FIG. 1 may include enumeration values such as enumeration values 124 representing actual values T2.Y at 128.

In some example embodiments, the values in the composite tuple set may include composite enumeration values for mapping the composite tuple set to the actual data values in the first and second tables. In the example of FIG. 2, table 110 and table 120 are encoded into composite tuple set/result tuple stream 210. FIG. 2 also includes encoding table 130 into composite tuple set 210. Encoding may include incorporating the enumeration values, such as enumeration values in T1.Y, T2.Y (and T3.Y), and an identifier that identifies the input tables such as T1 or T2 (or T3). Using the example of FIGS. 1 and 2 to illustrate, unifying T1 110 into composite tuple set 210 may produce a composite union enumeration value (0, 1) at 214 wherein the 0 value in 214 represents that the table T1 110 is identified as table 0, and the 1 value is representative of the enumeration value of 1 in the first row of T1.Y at 110. Continuing the example of FIGS. 1 and 2, encoding T2 120 into composite tuple set 210 may produce a composite union enumeration value (1, 1) at 218 wherein the first 1 value in 218 represents that the table T2 120 is identified as table 1, and the second 1 value is representative of the enumeration value of 1 in the first row of T2.Y at 120. Composite tuple set 210 may be generated in this way with column 204 containing composite union enumeration values and column 202 containing T.X values. In some example embodiments, column 202 may be a concatenation of values from T1.X, followed by T2.X, followed by T3.X. The input tables may be assembled in any other order as well. The composite enumeration values may be generated and stored in accordance with the three ways described with respect to FIG. 3.

At 440, the query execution plan may include decoding a composite union enumeration to select a constituent table from a plurality of tables based on an identifier value that is included in the composite union enumeration. The identifier value may be included in a first part of the composite union enumeration. Continuing the example of FIG. 2, a composite union enumeration value of (1, 1) may include the identifier value 1 corresponding to table T2 at 120. The query execution plan may further include mapping a second part of the composite union value to a data value in the selected table by mapping a second enumeration value in the second part of the composite union value to the data value.

At 450, the data value may be determined by looking up in a lookup table the data value based on the second enumeration value. In some example embodiments, the second enumeration value (or input enumeration value) may be determined from a composite enumeration value. In some example embodiments, a second part of the composite enumeration value may include the second enumeration value. For example, from composite enumeration value (2,1) in FIG. 2, the input enumeration value may be determined. For example, the 1 in (2,1) may represent that the input table has enumeration value 1. In this example, the first part identifies Table T2 at 120. The second part of the composite union enumeration value, which has value 1, enumerates which value in the database corresponds to the actual value. In this example, enumerated value 1 in table T2 at 120 corresponds to the actual value of "New York."

At 460, the query may be executed according to the query execution plan to obtain the data value. In some example embodiments, the actual value such as the T.Y value in FIGS. 1 and 2 may be determined from a composite enumeration value. For example, from composite enumeration value (2,1) in FIG. 2, the corresponding T.Y value may be determined. The 2 in (2,1) may be represent that the input table has identifier 2. In the example of FIG. 2, identifier 2 represents table T3 at 130. The 1 in (2,1) may represent that the input table has enumeration value 1. In the example of FIG. 2, enumeration value 1 in T3 at 130 has actual value of "Massachusetts." In this way, the composite union enumeration represents actual values from the input tables such as the first and second tables. At 450, the data value may be provided to the remote computing system.

In some example embodiments, the query may include a composite union enumeration value referencing a composite virtual table that includes two or more constituent incoming tuple sets. An incoming tuple set may be a normal database table, a temporary table, a virtual table, or the result of other query operators. In some example embodiments, the instant subject matter can be applied in when an element of the composite tuple set is derived from elements within the incoming tuple sets which are enumeration values or can be turned into enumeration values. In some example embodiments, the example query, T.X may be derived from T1.X, T2.X and T3.X, none of which are enumeration values, so using enumerated values for the union result tuple stream may not be appropriate. In the example query, the result tuple element T.Y is derived from T1.Y, T2.Y, and T3.Y, which are enumerated columns, so the use of composite union enumeration to encode T.Y may be appropriate and doing so may reduce the costs of evaluating the query. In some example embodiments, the composite tuple set may include elements which are enumeration values and the data value may be included in one of the constituent databases/tables. In some example embodiments, the composite union enumeration value may include a pair of enumeration values. The first in the pair, or the first part, may identify one of the constituent tables. The second in the pair, or the second part, may include a second enumeration for determining the data value in the identified table.

Figure 5:
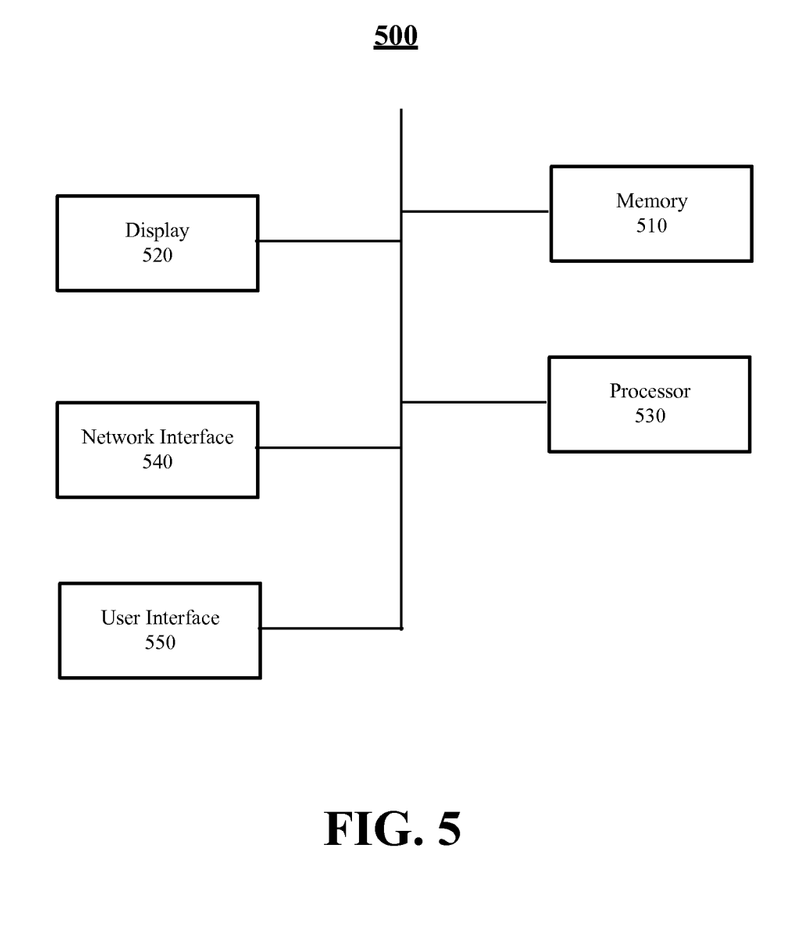
FIG. 5 depicts an apparatus, in accordance with some example embodiments.

FIG. 5 depicts a computing apparatus 500, in accordance with some implementations. Computing apparatus 500 may perform the processes 400. Computing apparatus 500 may include one or more processors such as processor 530 to execute instructions that may implement operations consistent with FIGS. 1-4. Apparatus 500 may include memory 510 to store executable instructions and/or information such as tables 110, 120, 130, and/or composite tuple set 210. Apparatus 500 may include a network interface 540 to a wired network or a wireless network. Wireless networks may include WiFi, WiMax, and cellular networks (2G/3G/4G/5G), and/or any other wireless network. Apparatus 500 may user interface 550 such as a keyboard, mouse, or other interface that may include a touchscreen integrated with display 520.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer-implemented method comprising:
accepting a database query including an operator requesting two or more incoming tuple streams be combined into a result tuple stream, wherein at least one data value in the incoming tuple streams is represented by an enumeration value;
generating a query execution plan for the database query, wherein the query execution plan includes:
encoding the enumeration value and a corresponding source identifier into a composite union enumeration, wherein the source identifier identifies which of the two or more tuple streams corresponds to the enumeration value;
decoding the composite union enumeration to the corresponding enumeration value and the source identifier; and
selecting a look-up table from a plurality of look-up tables, each look up table comprising enumerated values and corresponding data values to map the enumeration value into the data value, wherein the selecting is based on the source identifier;
executing the database query according to the query execution plan to obtain the data value; and
providing the data value in response to the database query.

2. The computer-implemented method of claim 1, wherein the operator is the SQL language UNION ALL operator.

3. The computer-implemented method of claim 1, wherein the source identifier is encoded as an integer representing the source identifier.

4. The computer-implemented method of claim 1, wherein the composite union enumeration is a pair of values, wherein one member of the pair is the enumeration value and the other member of the pair is an encoding of the source identifier.

5. The computer-implemented method in claim 4, wherein a plurality of composite union enumerations minimizes a storage required to store the composite union enumerations, and wherein each composite union enumeration comprises a pair of integer values.

6. The computer-implemented method of claim 1, wherein the composite union enumeration comprises a single integer value, wherein the single integer value lies in one of a plurality of ranges, wherein the plurality of ranges comprises a quantity of ranges equal to a quantity of the source identifiers, wherein the one of the plurality of ranges encodes the source identifier, and wherein a distance from the start of the one of the plurality of ranges to the single integer value encodes the enumeration value.

7. The computer-implemented method of claim 1, wherein a decision to create the query execution plan is made on the basis of estimated costs and benefits.

8. The computer-implemented method in claim 1, wherein the at least one data value in the incoming tuple streams represented by the enumeration value comprises one or more of: a column represented using an enumerated storage, a secondary enumeration over a column represented using an enumerated storage, a value expression encoded using a temporary enumeration, and a composite union enumeration from a lower level UNION ALL operator.

9. A non-transitory computer readable medium containing executable instructions, that when executed by at least one processor perform operations comprising:
accepting a database query including an operator requesting two or more incoming tuple streams be combined into a result tuple stream, wherein at least one data value in the incoming tuple streams is represented by an enumeration value;
generating a query execution plan for the database query, wherein the query execution plan includes:
encoding the enumeration value and a corresponding source identifier into a composite union enumeration, wherein the source identifier identifies which of the two or more tuple streams corresponds to the enumeration value;
decoding the composite union enumeration to the corresponding enumeration value and the source identifier; and
selecting a look-up table from a plurality of look-up tables, each look up table comprising enumerated values and corresponding data values to map the enumeration value into the data value, wherein the selecting is based on the source identifier;
executing the database query according to the query execution plan to obtain the data value; and
providing the data value in response to the database query.

10. The non-transitory computer readable medium of claim 9, wherein the operator is the SQL language UNION ALL operator.

11. The non-transitory computer readable medium of claim 9, wherein the source identifier is encoded as an integer representing the source identifier.

12. The non-transitory computer readable medium of claim 9, wherein the composite union enumeration is a pair of values, wherein one member of the pair is the enumeration value and the other member of the pair is an encoding of the source identifier.

13. The non-transitory computer readable medium of claim 9, wherein a plurality of composite union enumerations minimizes a storage required to store the composite union enumerations, and wherein each composite union enumeration comprises a pair of integer values.

14. The non-transitory computer readable medium of claim 9, wherein the composite union enumeration comprises a single integer value, wherein the single integer value lies in one of a plurality of ranges, wherein the plurality of ranges comprises a quantity of ranges equal to a quantity of the source identifiers, wherein the one of the plurality of ranges encodes the source identifier, and wherein a distance from the start of the one of the plurality of ranges to the single integer value encodes the enumeration value.

15. The non-transitory computer readable medium of claim 9, wherein a decision to create the query execution plan is made on the basis of estimated costs and benefits.

16. The non-transitory computer readable medium of claim 9, wherein the at least one data value in the incoming tuple streams represented by the enumeration value comprises one or more of: a column represented using an enumerated storage, a secondary enumeration over a column represented using an enumerated storage, a value expression encoded using a temporary enumeration, and a composite union enumeration from a lower level UNION ALL operator.

17. A system compromising:
at least one processor; and
at least one memory including instructions that when executed by the at least one processor provide operations comprising:
accepting a database query including an operator requesting two or more incoming tuple streams be combined into a result tuple stream, wherein at least one data value in the incoming tuple streams is represented by an enumeration value;

generating a query execution plan for the database query, wherein the query execution plan includes:

encoding the enumeration value and a corresponding source identifier into a composite union enumeration, wherein the source identifier identifies which of the two or more tuple streams corresponds to the enumeration value;

decoding the composite union enumeration to the corresponding enumeration value and the source identifier; and selecting a look-up table from a plurality of look-up tables, each look up table comprising enumerated values and corresponding data values to map the enumeration value into the data value, wherein the selecting is based on the source identifier;

executing the database query according to the query execution plan to obtain the data value; and providing the data value in response to the database query.

18. The system of claim 17, wherein the composite union enumeration is a pair of values, wherein one member of the pair is the enumeration value and the other member of the pair is an encoding of the source identifier.

19. The system of claim 18, wherein a plurality of composite union enumerations minimizes a storage required to store the composite union enumerations, and wherein each composite union enumeration comprises a pair of integer values.

20. The system of claim 17, wherein the composite union enumeration comprises a single integer value, wherein the single integer value lies in one of a plurality of ranges, wherein the plurality of ranges comprises a quantity of ranges equal to a quantity of the source identifiers, wherein the one of the plurality of ranges encodes the source identifier, and wherein a distance from the start of the one of the plurality of ranges to the single integer value encodes the enumeration value.

* * * * *